US011279318B2

(12) United States Patent
 Lee

(10) Patent No.: US 11,279,318 B2
(45) Date of Patent: Mar. 22, 2022

(54) VEHICLE SEAT BELT PRETENSIONER

(71) Applicants: HYUNDAI MOTOR COMPANY, Seoul (KR); KIA MOTORS CORPORATION, Seoul (KR)

(72) Inventor: Hyun Woo Lee, Ansan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/930,629

(22) Filed: Jul. 16, 2020

(65) Prior Publication Data

US 2021/0179012 A1 Jun. 17, 2021

(30) Foreign Application Priority Data

Dec. 11, 2019 (KR) .......................... 10-2019-0165130

(51) Int. Cl.
  *B60R 22/46* (2006.01)
  *B60R 22/195* (2006.01)

(52) U.S. Cl.
  CPC ...... *B60R 22/4628* (2013.01); *B60R 22/1951* (2013.01); *B60R 22/1954* (2013.01)

(58) Field of Classification Search
  CPC ............ B60R 22/4628; B60R 22/1951; B60R 22/1954; B60R 22/4676; B60R 22/1955
  See application file for complete search history.

(56) References Cited

U.S. PATENT DOCUMENTS

| 5,887,897 | A  | * | 3/1999 | Gill ..................... B60R 22/1952 |
|---|---|---|---|---|
|  |  |  |  | 280/806 |
| 2002/0105181 | A1 | * | 8/2002 | Specht ................ B60R 22/1952 |
|  |  |  |  | 280/806 |
| 2003/0038473 | A1 | * | 2/2003 | Specht ................ B60R 22/1951 |
|  |  |  |  | 280/806 |
| 2017/0225644 | A1 | * | 8/2017 | Jaradi ..................... B60R 22/28 |
| 2020/0407063 | A1 | * | 12/2020 | Walker ................... B64D 25/06 |

FOREIGN PATENT DOCUMENTS

| CN | 103958292 A | * | 7/2014 | ......... B60R 22/3408 |
| DE | 2411702 A1 | * | 9/1975 | ......... B60R 22/1955 |
| DE | 3718117 A1 | * | 12/1988 | ......... B60R 22/4652 |
| DE | 19957794 A1 | * | 8/2001 | .......... B60R 22/201 |
| EP | 0217175 A1 | * | 4/1987 | ......... B60R 22/1951 |
| FR | 2798634 A1 | * | 3/2001 | ........... B60R 22/023 |

(Continued)

OTHER PUBLICATIONS

Robinet, The Seat Belt Fittings, for Vehicles with Pairs of Seats, Have a Central, Common Automatic Tensioning Device Fitted to the Fixed Point of the Primary Belt and the Anchorage Catch of the Secondary Belt, Mar. 23, 2001, EPO, FR 2798634 A1, Machine Translation of Description (Year: 2001).*

*Primary Examiner* — James A English
*Assistant Examiner* — Matthew D Lee
(74) *Attorney, Agent, or Firm* — Lempia Summerfield Katz LLC

(57) ABSTRACT

A seat belt pretensioner of a vehicle include: a displacement generator to generate a linear displacement in a seat frame; and a webbing guide that receives the linear displacement generated by the displacement generator and pulls a webbing. In particular, the webbing extends from a retractor fixed to the seat frame to the outside of the seat.

9 Claims, 9 Drawing Sheets

(56) References Cited

FOREIGN PATENT DOCUMENTS

| JP | 2000142319 | A | * | 5/2000 | ......... | B60R 22/4628 |
| JP | 2003025955 | A | * | 1/2003 | ......... | B60R 22/1952 |
| JP | 2013226901 | A | * | 11/2013 | ......... | B60R 22/4652 |
| KR | 100230202 | B1 | * | 11/1999 | ......... | B60R 22/4628 |
| KR | 10-1491409 | B1 | | 2/2015 | | |
| WO | WO-2017212979 | A1 | * | 12/2017 | ............ | B60R 22/20 |

* cited by examiner

VEHICLE SEAT BELT PRETENSIONER

CROSS REFERENCE TO RELATED APPLICATION

The present application claims priority to and the benefit of Korean Patent Application No. 10-2019-0165130, filed Dec. 11, 2019, the entire contents of which are incorporated herein by reference.

FIELD

The present disclosure relates to a seat belt pretensioner of a vehicle.

BACKGROUND

The statements in this section merely provide background information related to the present disclosure and may not constitute prior art.

A seat belt pretensioner is a supplementary device that pulls a seat belt in the event of a vehicle crash, thereby restraining the passenger more firmly.

In the conventional three-point seat belt system, a pretensioner is implemented in a retractor and is then mounted to a vehicle body. However, we have discovered that in the case of a vehicle that requires free movement of a seat, such as an autonomous vehicle in the future, the retractor and the pretensioner are desired to be mounted to the seat in order to provide the mobility of the seat.

The retractor is a reel device that contains a webbing of the seat belt and functions to freely release and retract the webbing and restrict the release and retraction of the webbing in the situation of a sharp acceleration or deceleration, such as in the event of a vehicle crash, thereby locking the same.

For overweight passengers, installation of a child seat, or the like, a specific length or more of the webbing is desired to be contained in the retractor. Thus, since the retractor in which the pretensioner is implemented as described above is bulky, it is not easy to embed the retractor in the seat.

The details presented as background information are intended only to assist with an understanding of the present disclosure, and should not be taken as acknowledging that they correspond to the prior art known to those skilled in the art.

SUMMARY

The present disclosure provides a seat belt pretensioner for a vehicle, which is primarily mounted inside the seat together with the retractor accommodating the webbing, and is implemented inside the seat so as to be separated from the retractor, thereby improving the mountability of the retractor to the seat. In addition, the seat belt pretensioner pulls a seat belt of a vehicle to restrain the passenger more firmly in the event of a vehicle crash, thereby reducing passenger injuries.

In one form of the present disclosure, a seat belt pretensioner of a vehicle may include: a displacement generator to generate a linear displacement in a seat frame; and a webbing guide to receive the linear displacement generated by the displacement generator and pull a webbing, which extends from a retractor fixed to the seat frame to the outside of the seat through a webbing outlet.

The displacement generator may include: a cylinder fixed to the seat frame; a piston installed to be movable in the cylinder; and a gas generator configured to provide gas to the cylinder to move the piston.

In one form, the webbing outlet is provided at an upper portion of the seat, and the webbing guide may be installed to pull the webbing downwards in the seat.

In another form, the webbing extended from the retractor may wrap around a lower surface of the webbing guide and extend to the outside of the seat.

The webbing guide may be supported by a guide fixing bracket at both ends of the webbing guide, and the guide fixing bracket may be connected to the piston so as to receive the displacement of the piston.

The webbing guide may rotate with respect to the guide fixing bracket.

In some forms of the present disclosure, the guide fixing bracket may be provided with a load limiter cover, which has a space therein, at both sides of the webbing guide, and the webbing guide is configured as a hollow shaft. In one form, the load limiter cover is configured to accommodate an extension portion of a load sensing shaft having a predetermined length in the inner space of the load limiter cover, and the load sensing shaft includes a support portion configured to go through an inside of the webbing guide over an entire length of the webbing guide.

The extension portion of the load sensing shaft may be accommodated in the inner space of the load limiter cover while being bent in a direction different from the support portion configured to support the webbing guide.

The webbing guide may be configured to receive the displacement of the piston through a flexible wire.

The cylinder and the gas generator may be fixed to a base body, and the flexible wire may be connected to the piston in the cylinder via the base body.

The base body may be fixed to the seat frame such that the cylinder is positioned lengthwise in a lateral direction of the seat.

The present disclosure can be implemented in the seat together with the retractor so as to be separated from the retractor, thereby improving the mountability of the retractor in the seat, and effectively performs a pretensioning function of pulling a webbing of a seat belt to restrain the passenger more firmly in the event of a vehicle crash, thereby reducing passenger injuries.

In addition, the present disclosure is capable of reducing the friction acting on the webbing, so that the webbing can be effectively released out of the retractor and retracted into the retractor, and reducing the friction when a pretensioning function is performed while pulling the webbing, so that the pretensioning function can be performed more effectively.

Further, the present disclosure also functions as a load limiter, thereby inhibiting passenger injuries that may be caused when the passenger is restrained by excessive load.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
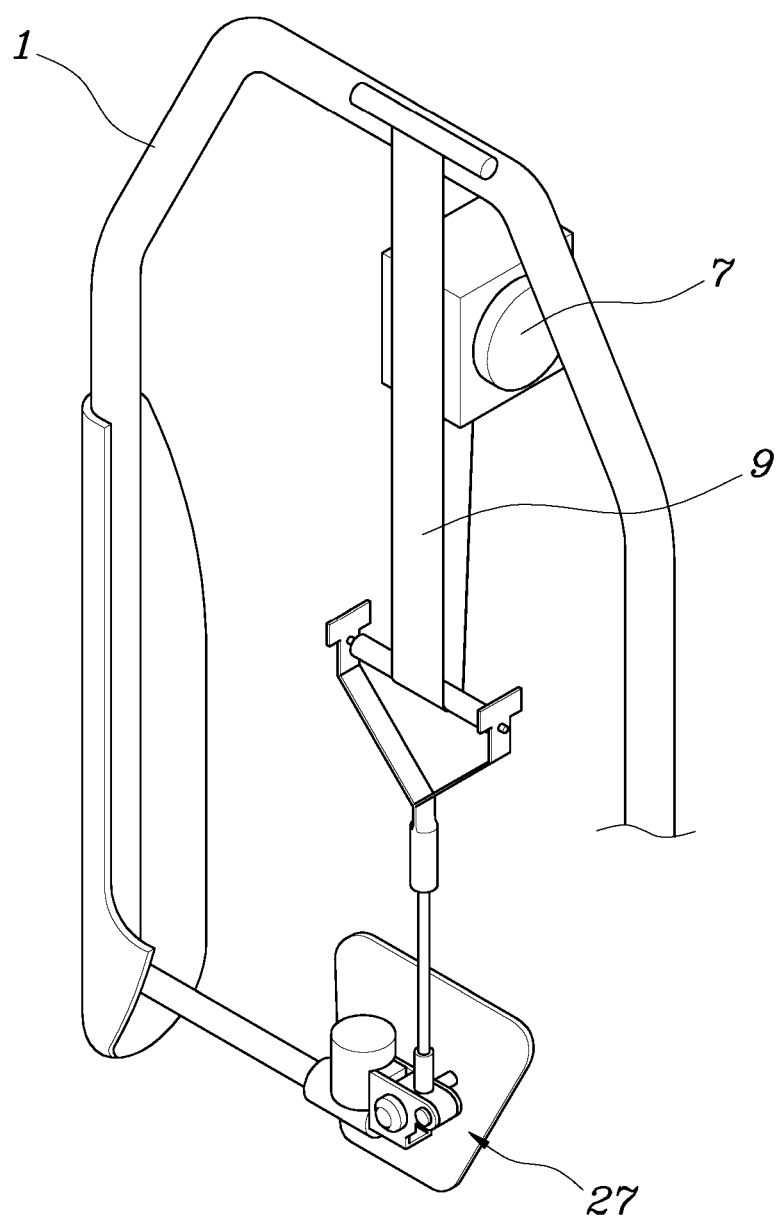
FIG. 1 is a view illustrating the state in which a seat belt pretensioner of a vehicle is installed in a seat frame according to one form of the present disclosure.
Figure 2:
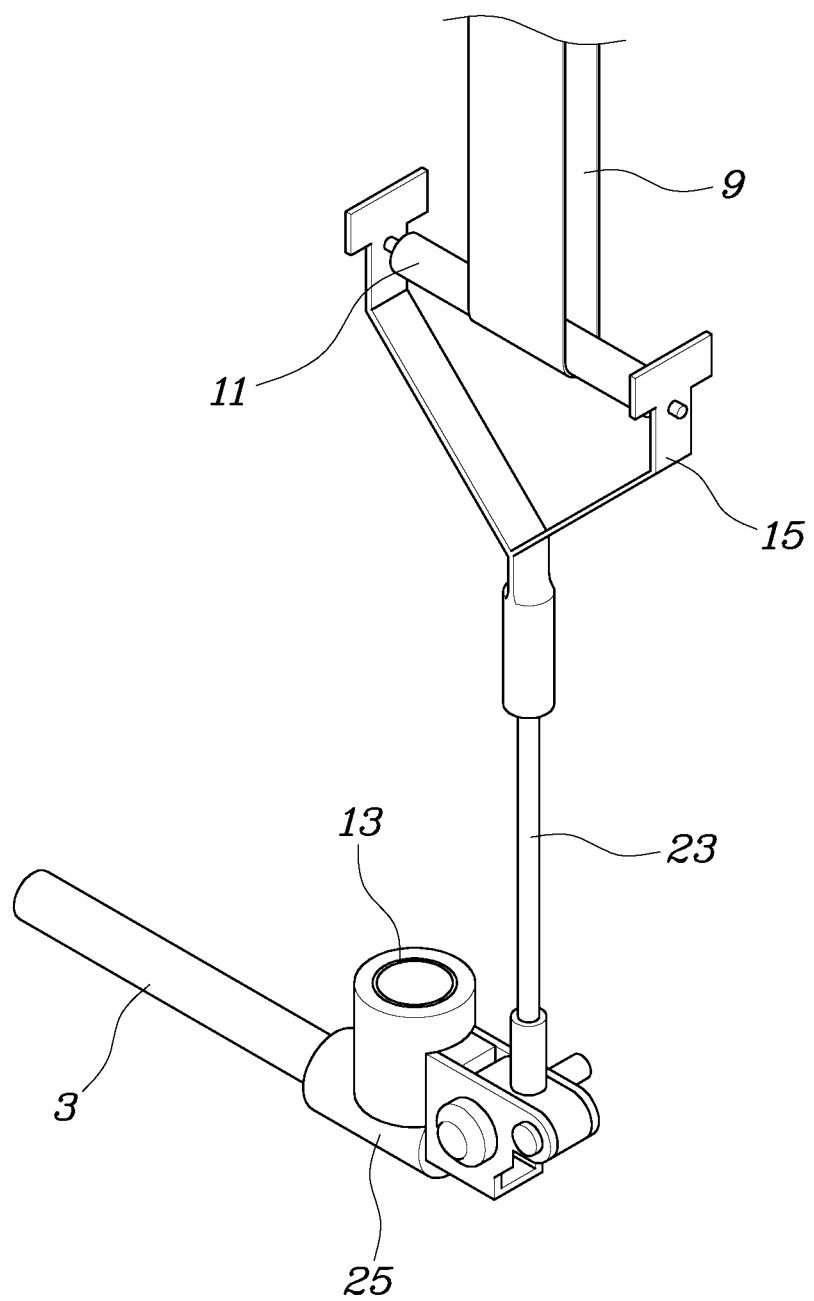
FIG. 2 is a view illustrating primary parts shown in FIG. 1.
Figure 3:
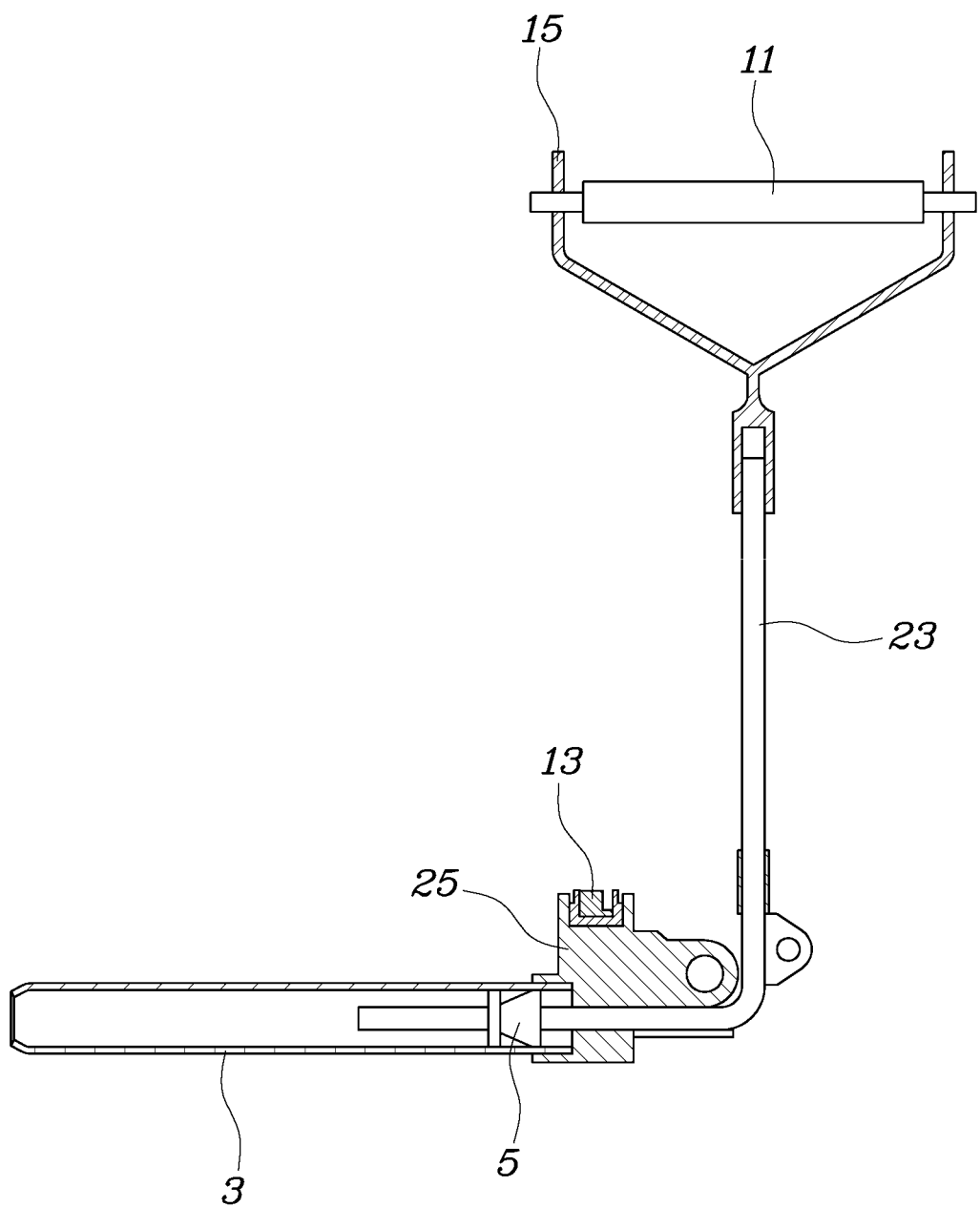
FIG. 3 is a cross-sectional view illustrating the structure of the seat belt pretensioner shown in FIG. 2.
Figure 4:
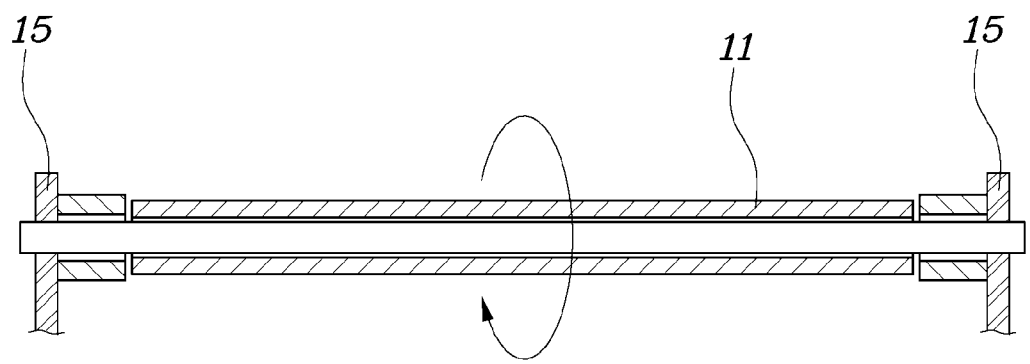
FIG. 4 is a view illustrating an example in which a webbing guide of the present disclosure is rotatably installed.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 to 6, a seat belt pretensioner of a vehicle according to one form of the present disclosure is configured to include a displacement generator provided to generate a linear displacement in a seat frame 1 and a webbing guide 11 installed to receive the displacement provided by the displacement generator and pull a webbing 9, which extends out of the seat through a webbing outlet from a retractor 7 fixed to the seat frame 1, between the retractor 7 and the webbing outlet.

In one form of the present disclosure, the displacement generator is configured to include a cylinder 3 fixed to the seat frame 1; a piston 5 installed to be movable inside the cylinder 3; and a gas generator 13 configured to provide the cylinder 3 with gas for moving the piston 5.

In one form, the gas generated by the explosion in the gas generator 13 moves the piston 5 when a pretensioning function is desired, such as in the event of a vehicle crash, so that the displacement of the piston 5 causes the webbing guide 11 to pull the webbing 9 extending from the retractor 7 mounted inside the seat, thereby restraining the passenger more firmly.

The retractor 7 has a relatively small volume because the retractor 7 does not employ the pretensioning function therein, and thus, as shown in the drawing, the retractor 7 may be easily fixed to the seat frame 1 inside the seat, thereby improving mountability of the retractor 7 with respect to the seat.

In one form, the webbing 9 extending from the retractor 7 extends out of the seat through the webbing outlet, which is provided at the upper portion of the seat, and the webbing guide 11 is installed so as to pull the webbing 9 downwards in the seat.

That is, the webbing guide 11 is provided such that webbing 9 extending from the retractor 7 extends upwards while wrapping the lower surface of the webbing guide 11 to then lead to the outside of the seat.

Figure 7:
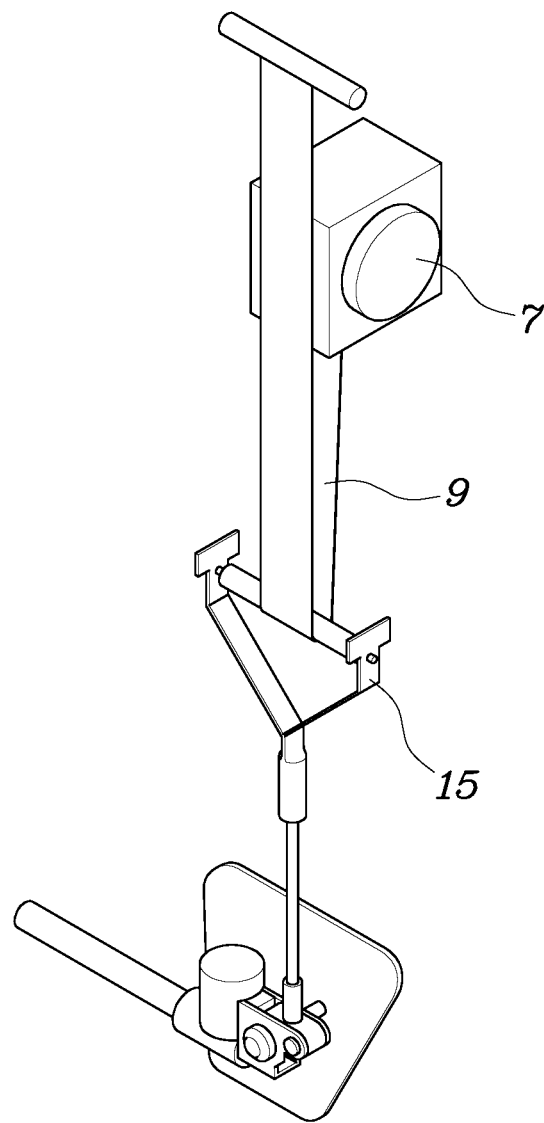
FIG. 7 is a view illustrating the state before a seat belt pretensioner in one form of the present disclosure performs a pretensioning function.
Figure 8:
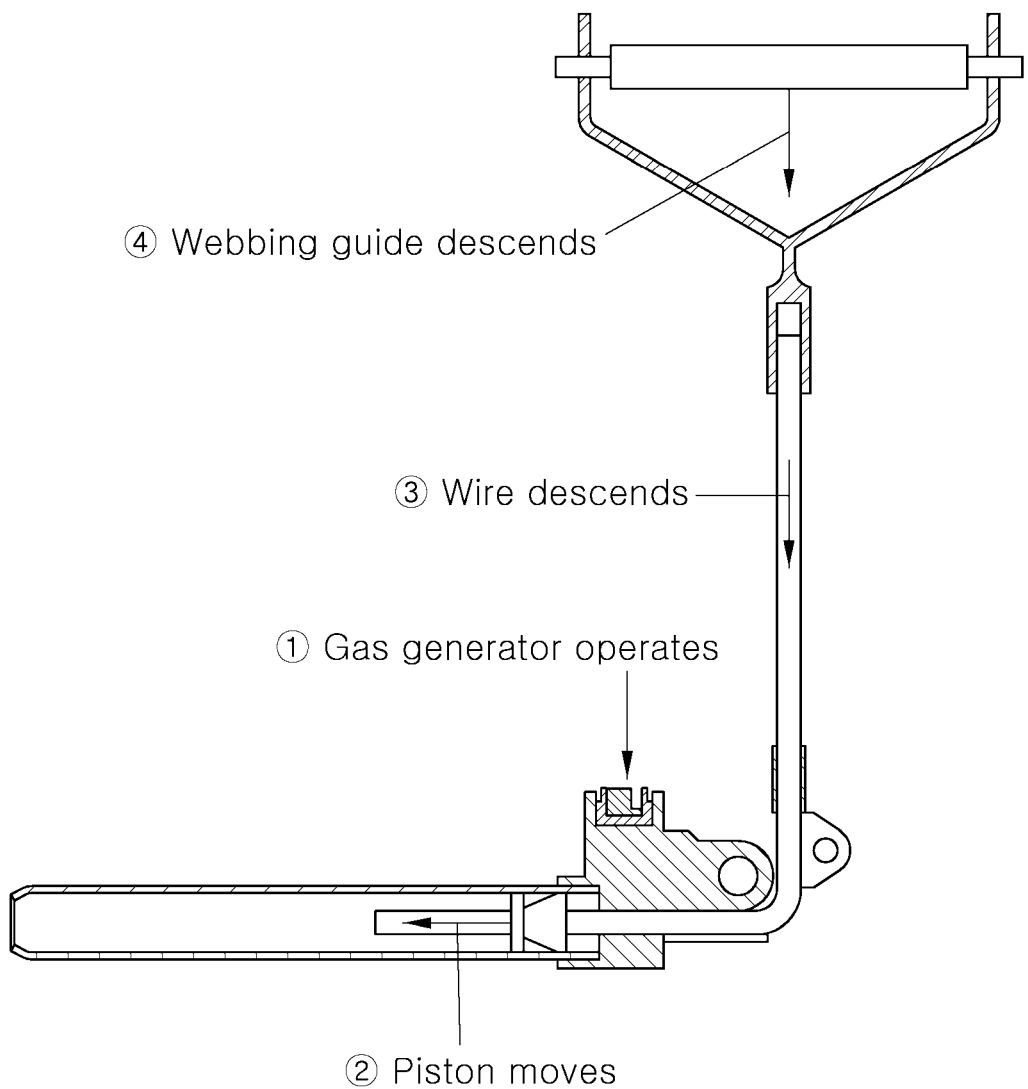
FIG. 8 is a view illustrating the principle in which a seat belt pretensioner in one form of the present disclosure performs a pretensioning function.

Therefore, when the webbing guide 11 moves downwards as shown in FIGS. 7 to 8, the webbing 9 is pulled by a length corresponding to twice the descending distance of the webbing guide 11.

This makes it possible to sufficiently perform the pretensioning function with a relatively small displacement of the webbing guide 11 and further reduce the displacement of the piston 5, so that the length of the cylinder 3 can also be relatively reduced.

For reference, the webbing outlet corresponds to one upper end that is not connected to the retractor 7, among two upper ends of the webbing 9 in FIG. 1.

The webbing guide 11 is configured as a member supported by the guide fixing bracket 15 at both ends thereof, and the guide fixing bracket 15 is connected to the piston 5 so as to receive the displacement of the piston 5.

In one form, the webbing guide 11 is supported so as to be rotatable with respect to the guide fixing bracket 15.

Thus, when a user pulls or releases the webbing 9 in order to fasten or release the seat belt in the state shown in FIG. 7, the webbing 9 is released out of the retractor 7 or retracted into the retractor 7. At this time, the webbing guide 11 supporting the webbing 9 rotates smoothly to reduce the friction force, thereby facilitating release or retraction of the webbing 9 described above.

Figure 9:
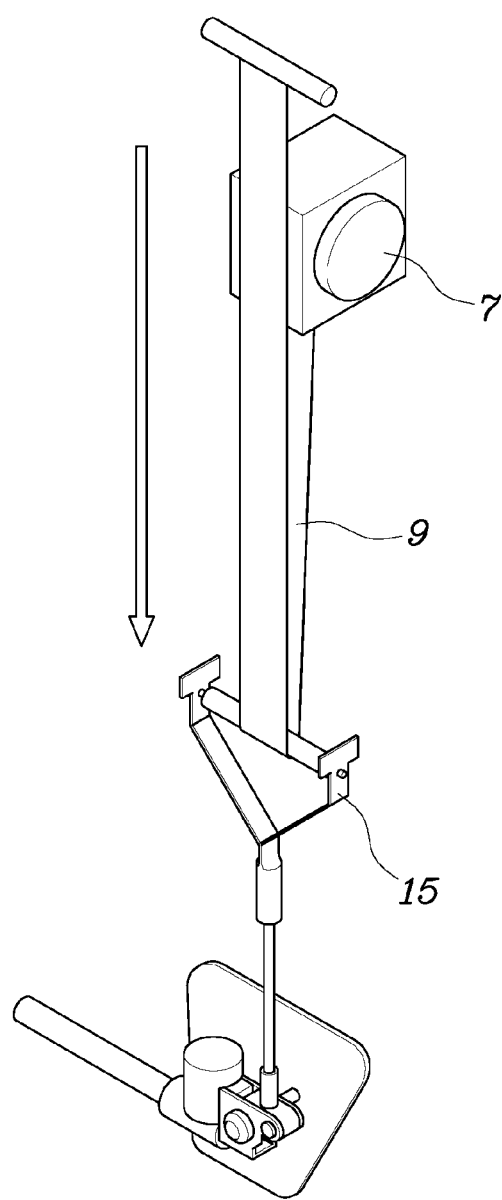
FIG. 9 is a view illustrating the state in which a seat belt pretensioner in one form of the present disclosure has performed a pretensioning function according to the operation described with reference to FIG. 8.

In addition, when the webbing guide 11 pulls the webbing 9 by performing the pretensioning function as shown in FIGS. 7 to 9, the webbing guide 11 is freely rotated as described above, thereby reducing the frictional force. This means that the force desired for pulling the webbing guide 11 in order to perform the pretensioning function can be reduced, which makes it possible to secure the degree of freedom to relatively reduce the capacity of the gas generator 13.

Figure 5:
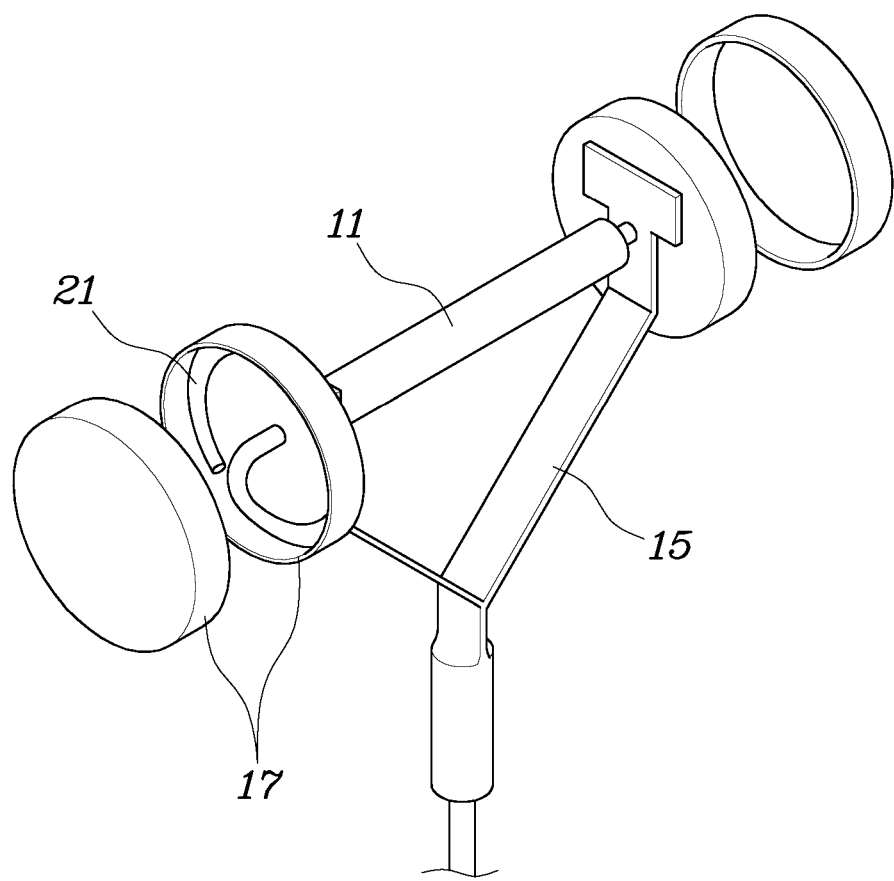
FIG. 5 is a view illustrating the structure in which a webbing guide in one form of the present disclosure is installed in a guide fixing bracket by a load sensing shaft and a load limiter cover.

Referring to FIG. 5, the guide fixing bracket 15 is provided with a load limiter cover 17, which has a space therein, at both sides of the webbing guide 11. The webbing guide 11 is configured as a hollow shaft, and a load sensing shaft 19 having an extension portion 21 having a predetermined length in the inner space of the load limiter cover 17 penetrates into the webbing guide 11 from one end to the opposite end. In one form, the load sensing shaft 19 includes a support portion that goes through an inside of the webbing guide (e.g., a hollow shaft) over an entire length of the webbing guide The extension portion 21 of the load sensing shaft 19, as shown in FIG. 5, is accommodated inside the load limiter cover 17 while being bent in the direction different from the support portion that supports the webbing guide 11.

Figure 6:
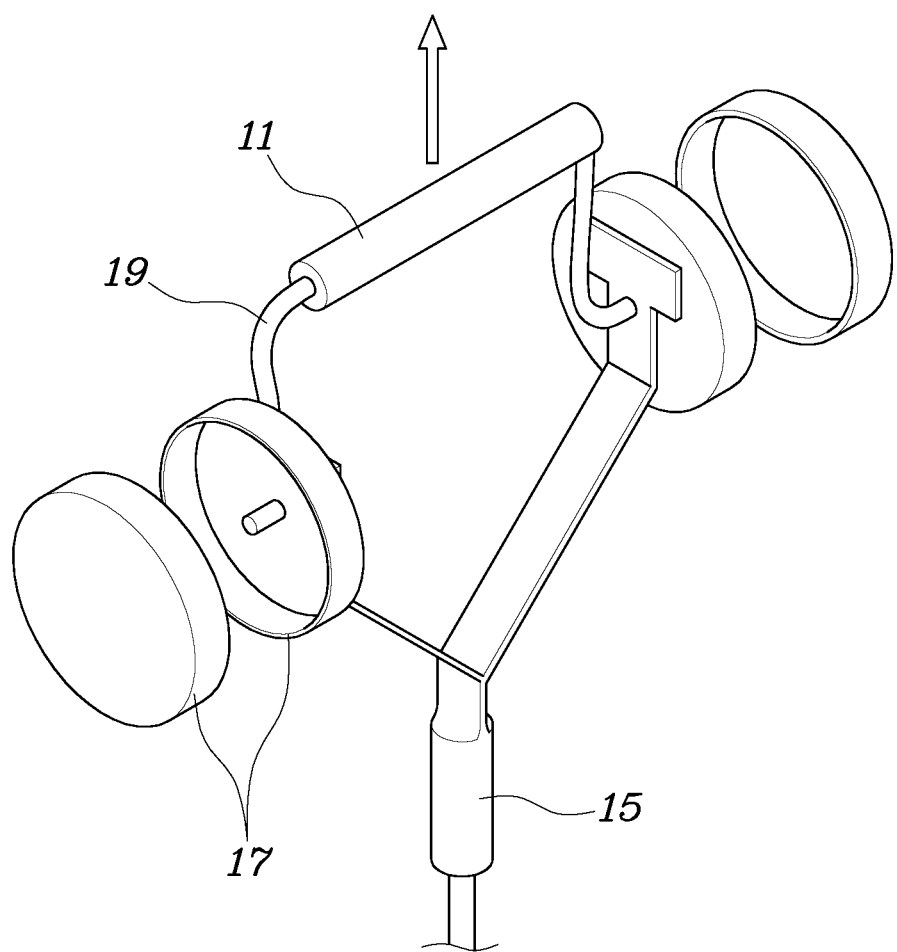
FIG. 6 is a view illustrating that the structure shown in FIG. 5 performs a load limiting function.

Therefore, in the case of a vehicle crash or the like, if the webbing 9 and the webbing guide 11 are strongly pulled upwards to a predetermined degree or more due to the behavior of the passenger, the extension portion 21 of the load sensing shaft 19 switches to the state shown in FIG. 6, in which the webbing guide 11 is moved upwards relative to the guide fixing bracket 15, thereby performing a load limiting function of mitigating the excessive load on the passenger.

Further, the degree to which the webbing 9 is pulled upwards for triggering the load limiting function may be adjusted according to the diameter, the material, and the like of the load sensing shaft 19. The amount of upward movement of the webbing guide 11 relative to the guide fixing bracket 15 may be adjusted by the length of the extension portion 21. It is desired to determine the diameter and material of the load sensing shaft 19, the length of the extension portion 21, and the like to be appropriate in order to reduce or minimize passenger injuries through a number of experiments and analysis.

In some forms of the present disclosure, the webbing guide 11 is configured to receive the displacement of the piston 5 through a flexible wire 23. That is, the guide fixing bracket 15 is connected to the piston 5 through the wire 23, so that the displacement of the piston 5 can be transmitted to the webbing guide 11. In addition, the cylinder 3 and the gas generator 13 are fixed to a base body 25, and the wire 23 is connected to the piston 5 inside the cylinder 3 via the base body 25.

In one form, the base body 25 is fixed to the seat frame 1 by means of a fixing bracket 27.

Therefore, the cylinder 3 is configured to be fixed to the seat frame 1 through the base body 25 and the fixing bracket 27, and the gas generated by the gas generator 13 is configured to be supplied to the inside of the cylinder 3 through the base body 25.

Meanwhile, the base body 25 is fixed to the seat frame 1 such that the cylinder 3 is positioned lengthwise in the lateral direction of the seat.

Therefore, the space allowing the displacement of the piston 5 may be formed long in the lateral direction of the seat, and the space allowing the displacement of the webbing guide 11, which interworks with the displacement of the piston 5, may be formed long in the vertical direction of the seat. This makes it possible to reduce or minimize the bending and the length of the wire 23 and to secure the excellent mobility of the piston 5.

While the present disclosure has been shown and described with respect to a specific form, it will be obvious to those skilled in the art that the present disclosure may be variously changed and modified without departing from the spirit of the present disclosure.

What is claimed is:

1. A seat belt pretensioner of a vehicle, the seat belt pretensioner comprising:
   a displacement generator configured to generate a linear displacement in a seat frame; and
   a webbing guide configured to:
      receive the linear displacement generated by the displacement generator and
      pull a webbing configured to extend from a retractor fixed to the seat frame to an outside of a seat through a webbing outlet,
   wherein:
      the webbing outlet is provided at an upper portion of the seat,
      the webbing guide is configured to pull the webbing downwards in the seat and
      the webbing extended from the retractor is configured to wrap around a lower surface of the webbing guide and extend upwards to the outside of the seat.

2. The seat belt pretensioner of claim 1, wherein the displacement generator comprises:
   a cylinder fixed to the seat frame;
   a piston installed to be movable in the cylinder; and
   a gas generator configured to provide gas to the cylinder to move the piston.

3. The seat belt pretensioner of claim 1, wherein:
   the webbing guide is supported by a guide fixing bracket at both ends of the webbing guide, and
   the guide fixing bracket is connected to a piston and configured to receive a displacement of the piston.

4. The seat belt pretensioner of claim 3, wherein the webbing guide is configured to rotate with respect to the guide fixing bracket.

5. The seat belt pretensioner of claim 3, wherein:
   the guide fixing bracket is provided with a load limiter cover at both sides of the webbing guide,
   the webbing guide is configured as a hollow shaft,
   the load limiter cover is configured to accommodate an extension portion of a load sensing shaft having a predetermined length in an inner space of the load limiter cover, and
   the load sensing shaft includes a support portion configured to go through an inside of the webbing guide over an entire length of the webbing guide.

6. The seat belt pretensioner of claim 5, wherein:
   the extension portion of the load sensing shaft is accommodated in the inner space of the load limiter cover while being bent in a direction different from the support portion configured to support the webbing guide.

7. The seat belt pretensioner of claim 1, wherein the webbing guide is configured to receive a displacement of a piston through a flexible wire.

8. The seat belt pretensioner of claim 7, wherein:
   a cylinder and a gas generator are fixed to a base body, and the flexible wire is connected to the piston in the cylinder via the base body.

9. The seat belt pretensioner of claim 7, wherein a base body is fixed to the seat frame such that a cylinder is positioned in a lateral direction of the seat.

\* \* \* \* \*